May 29, 1928.

A. RUBIN 1,671,784

ADJUSTABLE SLIDE STRUCTURE

Filed Feb. 21, 1927

INVENTOR
Adolph Rubin.
By Bakewell & Cornwell
ATTORNEYS

Patented May 29, 1928.

UNITED STATES PATENT OFFICE.

1,671,784

ADOLPH RUBIN, OF ST. LOUIS, MISSOURI, ASSIGNOR TO SIEBER PRODUCTS MANUFACTURING COMPANY, OF ST. LOUIS, MISSOURI, A CORPORATION OF MISSOURI.

ADJUSTABLE-SLIDE STRUCTURE.

Application filed February 21, 1927. Serial No. 170,039.

This invention relates to structures of the type that comprise a slide or other member adjustably mounted on a supporting structure or combined with another member in such a way that the position of the slide or the position of the two members, relatively to each other, can be changed easily. Examples of structures of the kind referred to are telescoped parts of loose leaf binders, and adjustable braces used on furniture.

The object of my invention is to provide a structure of the general type referred to, that is equipped with a novel means of inexpensive construction and of simple design for securely clamping the two co-operating members of the structure together.

Figure 1 of the drawings is a top plan view, illustrating my invention embodied in a slide that is adjustably mounted on a supporting member.

While I have herein illustrated my invention embodied in a structure that comprises a slide or other part adjustably mounted on a supporting member, I wish it to be understood that my invention is applicable to various other kinds of structures comprising two members arranged in sliding engagement or in telescopic relation and adapted to be adjusted by moving one member longitudinally of the other member.

In the accompanying drawings which illustrate the preferred form of my invention A designates a slide or other part mounted on a supporting member B in such a way that it can be adjusted longitudinally of said supporting member. The members A and B are provided with co-operating interlocking portions that hold said members in assembled condition, and a manually-operable means is provided for exerting pressure on one of said members in a direction tending to separate or force said members apart, and thus cause the co-operating interlocking portions on same to be clamped tightly together, so as to hold the slide A in adjusted position. The slide A and member B can be of various shapes in cross section, but I prefer to make the supporting member B substantially trough-shaped in cross section and provide it with laterally-projecting flanges 1 that are embraced or overlapped by hook-shaped portions 2 on the slide A, thereby causing the members A and B to be interlocked with each other in such a way that the slide A can be adjusted longitudinally of the supporting member B.

Figure 1:
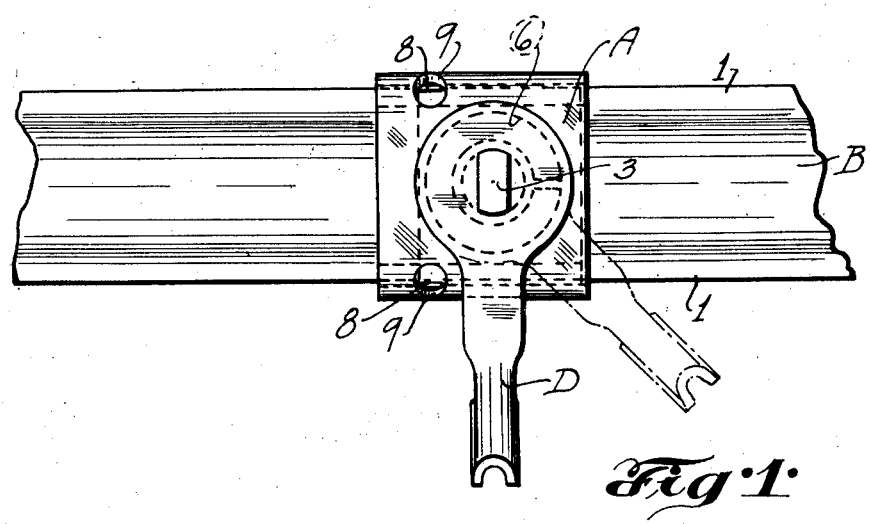
Figure 2:
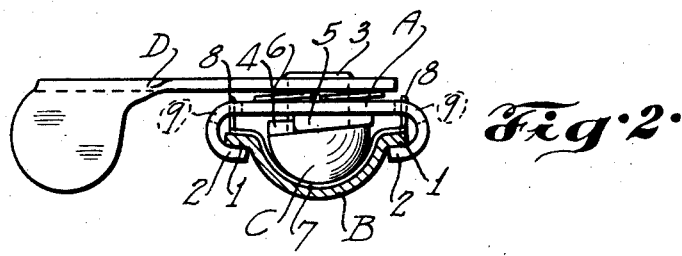
Figure 2 is an end view of the slide, showing the supporting member of the structure in cross section and clamped to the slide.
Figure 3:
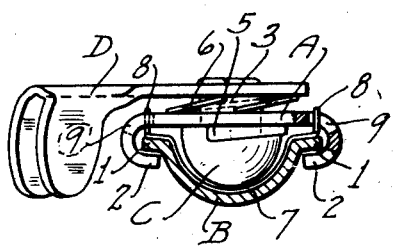
Figure 3 is a similar view, showing the slide released.
Figure 4:
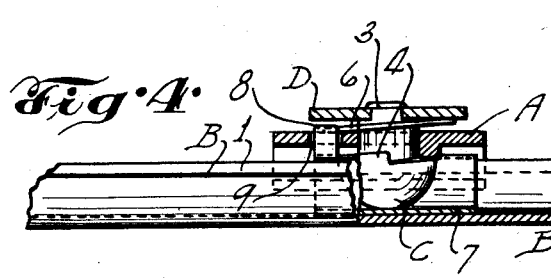
Figure 4 is a side elevational view of the structure partly in vertical longitudinal section.

The clamping of the slide A to the supporting member B is effected by turning or oscillating a clamping device C on the slide A, so as to cause said device to exert pressure on the supporting member B in a direction to cause the co-operating interlocking portions 1 and 2 on the members B and A to be drawn into tight engagement with each other. In the form of my invention herein illustrated the clamping device C consists of a substantially semi-spherical-shaped member interposed between the slide A and the member B and provided with a shank or spindle 3 that projects upwardly through the slide and which is rigidly attached at its upper end to a lever or finger piece D that is adapted to be manipulated so as to turn the slide or device C. The device C is provided on its upper side with a pair of cams or inclined surfaces 4 that co-operate with cams or inclined surfaces 5 on the underside of the slide A to force the device C downwardly (looking at Figures 2 and 3), so as to exert pressure on the member B in a direction to draw the flanges 1 thereon into tight engagement with the hook-shaped portions 2 on the slide when the lever or finger piece D is manipulated to turn the device C in one direction. When the slide A is in its released position, as shown in Figure 3, the high points of the cams 4 on the clamping device C are in engagement with the low points of the cams 5 on the underside of the slide A, said co-operating cams being held in sliding engagement with each other by a resilient means 6 interposed between the top face of the slide A and the hub of the lever D and herein illustrated as consisting of a split spiral washer. When the lever D is swung from the position shown in broken lines in Figure 1 into the position shown in full lines in said figure, the high points of the cams 4 of the clamping device C ride up onto the high points of the cams 5 on the slide, as shown in Figure 2, thereby causing the device C to move downwardly relatively to the slide and exert pressure on the member B in such a direction that the hook-shaped portions 2 on the slide will be drawn into sufficiently tight engagement with the flanges 1 on the supporting member B to securely hold the slide in adjusted postion. To release the slide, preparatory to moving it into a different position, it is only necessary to swing the lever D in the reverse direction, i. e., back into the position shown in broken lines in Figure 1, so as to relieve the clamping pressure of the device C on the member B. In view of the fact that the clamping device C is substantially semi-spherical-shaped in outline, it has a relatively great bearing area on the member B which is preferably of such cross-sectional shape that it will conform approximately to the cross-sectional shape of the device C, thereby insuring the slide being clamped firmly to the member B on which it is mounted. If desired, a wear piece 7 consisting of a piece of thin sheet metal that conforms approximately to the cross-sectional shape of the supporting member B can be interposed between the clamping device C and the inner side of the member B, so as to prevent said clamping device from marring the member B, the wear piece 7 having upwardly projecting arms or legs 8 that pass through holes 9 in the slide, as shown clearly in the drawings.

While I prefer to form the structure in the manner above described, on account of the fact that such a structure is inexpensive to manufacture, it is reliable in operation, and it is strong and rugged enough to successfully withstand rough usage, I wish it to be understood that the means used to draw the opposed parts of the two members A and B of the structure into clamping engagement with each other can be constructed in various ways without departing from the spirit of my invention. Moreover, while I have herein illustrated one member of the structure, referred to as the slide, as being provided with substantially hook-shaped portions that embrace flanges on the other member of the structure, referred to as the supporting member, I wish it to be understood that it is not essential that the two members of the structure be provided with co-operating opposed parts of the particular form shown, as my broad idea consists of a structure composed of two telescoped members or two interlocked members arranged in sliding engagement with each other combined with a means carried by one of said members and adapted to be manipulated so as to exert pressure on the other member in a direction to draw opposed parts of said members into sufficiently snug engagement with each other to securely clamp said members and prevent relative movement of same.

Having thus described my invention, what I claim as new and desire to secure by Letters Patent is:

1. In a structure of the kind described, the combination of two members arranged in sliding engagement and provided with opposed parts, and a means interposed between said members that is adapted to be manipulated so as to exert pressure on said members in a direction tending to separate them and thus draw the opposed parts on said members into snug engagement with each other.

2. In a structure of the kind described, the combination of two interlocked members arranged in sliding engagement with each other, and a rotatable or oscillatable clamping device interposed between said members and provided with a cam that co-operates with a cam on one of said members to cause said device to exert pressure on the other member in a direction to draw the interlocked portions of said members into snug engagement with each other when said device is turned in one direction.

3. In a structure of the kind described, the combination of two members arranged in sliding engagement with each other and provided with co-operating portions that prevent said members from pulling apart, an oscillatable or rotatable clamping device carried by one of said members and arranged in opposed relation to the other member, and means whereby rotary movement of said device in one direction causes said device to exert pressure on the member to which it is opposed in a direction to draw the co-operating portions of said members into tight engagement with each other.

4. In a structure of the kind described, the combination of two interlocked members arranged in sliding engagement with each other, an oscillatable or rotatable clamping device arranged between said members and provided with a shank that passes through one of said members, a lever or finger piece attached to said shank, co-operating cams or inclined surfaces on said clamping device and on the member which carries said device, and a resilient means for retaining said cams in engagement with each other.

5. In a structure of the character described, the combination of two members arranged in sliding engagement with each other and provided with co-operating interlocking portions, one of said members being substantially trough-shaped in cross section, a substantially semi-spherical-shaped clamping device arranged between said members and adapted to be turned or oscillated, and means whereby rotary movement of said clamping device causes said device to exert pressure on said trough-shaped member in a direction to cause the co-operating interlocking portions on said members to be drawn tightly together.

6. In a structure of the character described, the combination of two interlocked members arranged in sliding engagement with each other, one of said members being substantially trough-shaped in cross section, a substantially semi-spherical-shaped clamping device arranged in said trough-shaped member and provided with a shank that projects through the other member, co-operating cams or inclined surfaces on said clamping device and on the member through which said shank passes, a lever or finger piece attached to said shank, and a spring interposed between said lever and the member through which the shank of the clamping device passes.

7. In a structure of the character described, the combination of two members arranged in opposed relation, one of said members being substantially trough-shaped in cross section and provided with laterally-projecting flanges, portions on the other member that lap over or embrace said flanges, an oscillatable or rotatable clamping device interposed between said members, co-operating means on said clamping device and on one of said members for causing said device to exert pressure on the other member in a direction tending to draw the flanges thereon tightly against the opposed portions of the other member, and a wear piece interposed between said clamping device and the flanged member.

ADOLPH RUBIN.